US005483690A

United States Patent [19]

Schröder

[11] Patent Number: 5,483,690

[45] Date of Patent: Jan. 9, 1996

[54] ARTIFICIALLY REDUCING SIGNAL REPRODUCTION QUALITY OF RECEIVED DEGRADED DIGITALLY CODED AUDIO DATA

[75] Inventor: Ernst F. Schröder, Hanover, Germany

[73] Assignee: Deutsche Thomson-Brandt GmbH, Germany

[21] Appl. No.: 161,822

[22] Filed: Dec. 3, 1993

Related U.S. Application Data

[63] Continuation of PCT/EP92/01182, May 26, 1992.

[30] Foreign Application Priority Data

Jun. 5, 1991 [DE] Germany .......................... 41 18 424.6

[51] Int. Cl.$^{6}$ ................................ H04B 1/12; H04L 1/20

[52] U.S. Cl. .................................... 455/226.1; 455/200.1; 455/213; 455/222; 375/350; 381/107

[58] Field of Search ............................ 455/152.1, 186.1, 455/186.2, 156.1, 200.1, 212, 213, 214, 221, 219, 222, 226.1–226.4, 238.1, 218; 375/10, 99, 103, 104, 224, 225, 346, 350, 351; 381/86, 107

[56] References Cited

U.S. PATENT DOCUMENTS

| | | | |
|---|---|---|---|
| 4,890,332 | 12/1989 | Takahashi | 455/226.2 X |
| 5,001,776 | 3/1991 | Clark | 455/226.1 |
| 5,187,811 | 2/1993 | Baker et al. | 455/218 X |
| 5,204,973 | 4/1993 | Sugayama | 455/212 |

FOREIGN PATENT DOCUMENTS

| | | | |
|---|---|---|---|
| 0039428 | 11/1981 | European Pat. Off. | H04B 12/2 |
| 3725487 | 2/1989 | Germany | H04H 1/00 |
| 8816338 | 7/1989 | Germany | H04B 17/00 |
| 4013204 | 10/1991 | Germany | H04J 3/16 |

OTHER PUBLICATIONS

De Journal: Successor Of UKW Audio Broadcasting, Funkshau–Spezial, No. 8, 1990, pp. 9–18 (With Translation).

*Primary Examiner*—Chi H. Pham

*Attorney, Agent, or Firm*—Joseph S. Tripoli; Eric P. Herrmann; James B. Hayes

[57] ABSTRACT

A radio broadcast receiver for receiving digitally coded sound broadcasting data (DAB) includes a bit error rate measuring device. A control device controls the reproduction of the sound broadcasting data, wherein a reception quality threshold value is defined in the control device and, upon the measured reception quality falling below the threshold value, the control device alters the reception quality and/or the reproduction signals in a perceptible manner.

11 Claims, 1 Drawing Sheet

Figure 1:
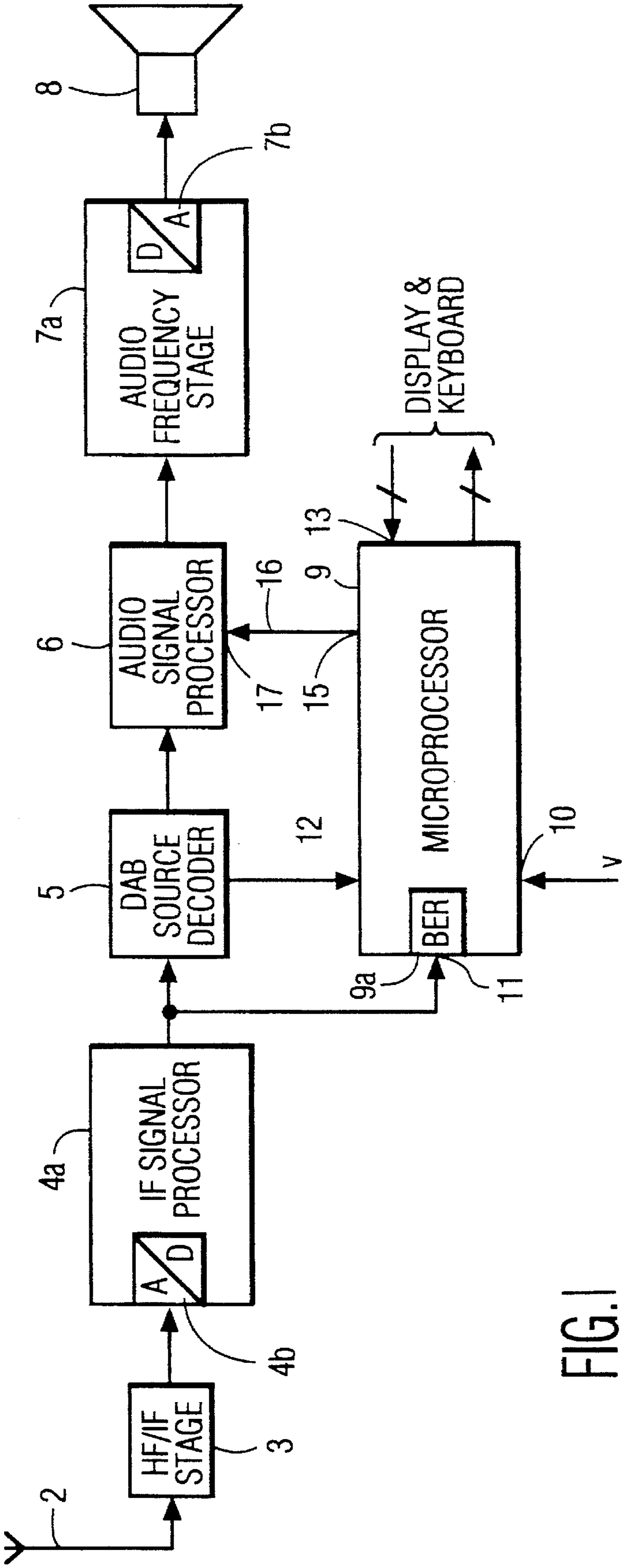

ARTIFICIALLY REDUCING SIGNAL REPRODUCTION QUALITY OF RECEIVED DEGRADED DIGITALLY CODED AUDIO DATA

This is a continuation of PCT application PCT/EP 92/01182 filed May 26, 1992 by Ernst Schroder and titled "PROCESS FOR PROCESSING AND REPRODUCING RECEIVED DIGITALLY CODED AUDIO DATA AND RADIO RECEIVER FOR DIGITAL AUDIO BROADCAST (DAB)."

With digital transmission media e.g. digital sound broadcasting (DAB, "DAB" is a trade mark of the TELEFUNKEN Fernseh und Rundfunk GmbH), there occurs an abrupt interruption of the reception at the edge of a coverage area i.e. when the transmission channel is at the limit of its capability. This also happens, in particular, when a high performance code is used for error correction. A transition from very good reception to no reception at all can thereby occur within a 1 dB reduction of the received voltage.

This behaviour is not desired since the user is not warned in good time to switch to another transmitter. On the contrary, upon the cessation of the reproduction, he will actually falsely assume that his receiving device has a fault or is defective such as having e.g. a destroyed IC, loose contacts, a broken loud speaker or the like.

The problem of not switching over to another transmitter in good time can of course generally be resolved with the aid of RDS for example but not in the case of a short term failure of reception such as can happen when driving under bridges or suchlike things.

The reception quality of VHF-FM is of course poorer at the edge of a coverage area of a transmitter but, from the point of view of reception behaviour, it is appreciably better since the transition from very good reception to impossible reception takes place over a range of the received voltage of up to 30 dB i.e. smoothly from good to bad over much greater distances.

For digital transmission systems, the suggestion is repeatedly made of inducing a so-called sliding worsening of reproduction—also known as "graceful degradation". From the Forum Report "Innovatives Europa", Report, Frank Müller-Römer: "Digital Audio Broadcast (DAB), Bonn-Bad Godesberg, 8th Mar. 1990, the general problem is known, of smoothly switching over from stereo to mono—in the same way as for VHF-FM—rather than having an abrupt interruption of the DAB reception in the event of reception field strengths becoming weaker and of worsening reception conditions. In adverse circumstances, one can assume that, during the switch-over from stereo to mono, the listener will not even notice the switch-over since the listening conditions are not always appropriate therefor or because the currently received transmission is in any case being transmitted in mono (e.g. a news broadcaster).

Moreover, the concept of the "graceful degradation" of a digital audio transmission system is known from J. Audio Engineering Reports Soc., Vol 36, No 1/2, 1988 January/February. There, the advantage of the "graceful degradation" is described for an audio reproduction where the audio signal is transmitted over channels having a large range of bandwidth. However, the measures indicated there are not suitable for providing a simple, cost effective and, for the listener, a permanently satisfactory solution of the problem described since, amongst other things, the outlay is quite considerable for a plurality of differently effective error correcting methods. It has also been shown that although a broadening of the cross-over region can indeed be achieved, this only amounts to little more than a few dB.

Since, in addition, the quality of the transmission path or of the reception frequently changes by large amounts on digital paths and especially for mobile reception, there arises a greatly fluctuating "graceful degradation" which does not correspond to the average behaviour of the transmission channel.

The object of the invention is to avoid, using simple means, an abrupt interruption of the reception or of the audio reproduction in the event of reception field strengths becoming weaker and of worsening reception conditions.

Furthermore, the object of the invention is to construct a radio broadcast receiver such that the aforesaid disadvantages do not occur upon reception of a digitally coded audio signal.

In accordance with the invention, the object is achieved by a method for the processing and reproduction of digitally coded audio data which has the features in accordance with the claim 20 and can also be gathered from the following description.

The further object of the invention is achieved, in accordance with the invention, by a radio broadcast receiver having the features in accordance with the claims and the following description.

The invention is based upon the following consideration: One measures the reception quality e.g. the bit error rate, of the received audio data using suitable means e.g. a bit error rate measuring device. The measured error rate or bit error rate or reception quality is a criterion for the transmission quality factor of the transmission channel or of the received audio data e.g. the quality factor is the reciprocal of the error rate. Furthermore, one defines a threshold value for the error rate (or transmission quality factor) which lies below (above) the error rate (or quality factor) at which the abrupt interruption of the reproduction or of the reception or of the transmission occurs.

Upon exceeding (falling below) the predetermined threshold value of the error rate (transmission quality factor), there occurs an alteration, which is readily perceptible for the user, of at least one reproduction parameter or of the quality of reproduction. This can happen during the reproduction in the form, for example, of an addition of noise or of a characteristic tone to the audio reproduction signal or else can be achieved by a reduction of the volume level of the reproduced signal or by a displacement of the transmission limiting frequency to low audible frequencies. The latter is achieved in that a digital low pass filter is arranged in the signal path of the audio signals to the reproduction device and is activated whereby the limiting frequency or the limiting of the low pass filter is reduced, preferably, variably or smoothly, upon the previously set threshold value of the error rate being exceeded and thus alters the reproduction frequency spectrum in a perceptible manner. If the measured error rate lies below the threshold value, the low pass filter does not have a varying effect upon the reproduction.

Thus, there is carried out an artificial "graceful degradation" whereby the reproduction signal is artificially altered in dependence on the quality of transmission or reception when there is a drop below a preset threshold value for the quality or quality factor of transmission or reception.

By means of the previously described simple measures, the user is made aware of an expected abrupt interruption of the reception in good time. For example, if a noise signal is added to the reproduction signal, the intended worsening of reproduction corresponds to what a listener of the VHF-FM reception is already used to, such as, for example, the increased noise when driving under bridges, when travelling through tunnels or at the edge of a signal propagation area, etc.

It is useful, to be able to variably set the threshold value. This is especially advantageous for mobile radio broadcast reception if the threshold value is altered in dependence on the speed of travel since even an average error rate can still mean a good reception or reproduction quality at high speed.

Preferably, the error rate or the quality factor criterion derived therefrom is subjected to a low pass filtering so that the artificial alteration in the reproduction device can occur more on the basis of the average channel quality. The low pass filter may then also have different time constants for its rise and/or fall.

The invention will be explained more fully hereinafter by means of one possible embodiment which is illustrated in the drawing.

The FIGURE shows a DAB mobile receiver 1 having a receiving antenna 2, a HF-IF section 3 connected therewith, an IF signal processor 4*a*, an A/D converter 4*b* integrated therein, a DAB source decoder 5, an audio signal processor 6, an AF amplifying stage 7*a* having a D/A converter 7*b* contained therein, a loud speaker 8 and a micro-processor 9 which contains a measuring device 9*a* (BER—Bit-ERROR-Rate) for the determination of the bit error rate of a digital signal.

In correspondence with the FIGURE, the digital signal processing specific to DAB is accomplished by the IF signal processor 4*a*, DAB source decoder 5 and audio signal processor 6 whereby these circuit sections are normally constructed as highly integrated circuits. The audio signal processor 6 takes over the audio functions such as tone control, volume control, mixing, balance etc., which are realised in present day receivers in analogue circuit technique. The IF signal processor 4*a* serves for extracting, from the signal which is delivered by the HF/IF section 3 that is conventionally constructed, the data stream contained therein.

For the control of the receiver, there serves the micro-processor 9, to which a value for the speed of travel is supplied via an input 10, to which the whole data stream or a part thereof is supplied via an input 11, to which data from the source decoder is supplied via an input 12, and to which input values from a (not illustrated) control device are supplied via further inputs 13 and 14. The micro-processor is connected to a control input 17 of the audio signal processor 6 via an output 15 and a control lead 16. Moreover, the micro-processor contains a bit error rate measuring device 9*a* which determines the error rate of the received signals from the data stream supplied via the input 11. A threshold value for the error rate, which is altered in dependence on the speed of travel, is stored in the micro-processor. The current error rate or the threshold value or a difference of the two values may be constantly indicated on a display.

In dependence upon whether the measured error rate exceeds the threshold value of the error rate, the audio signal processor is controlled in such a way that a noise, which is easily perceptible by the listener, is added to the AF signal that is to be amplified. If the reception is abruptly interrupted, then only a noise or a characteristic signal which is generated by the audio signal processor (either constantly or occasionally) is to be heard from the loud speaker 8. The perceptible, artificial alteration of the audio signal increases smoothly or in steps, each time, in dependence upon how much the threshold value of the error rate is exceeded. To this end, the measured value of the error rate is subjected to a low pass filtering in the micro-processor so that the artificial alteration occurs more on the basis of the average channel quality. The low pass filter has different and/or variable time constants for the rises and falls. The threshold value is altered, preferably raised, with increasing speed of travel.

Moreover, in dependence upon the rise of the measured error rate, various switch-overs of the HF/IF section 3 are effected via a control lead 18 by the micro-processor 9. If the error rate increases in a jumplike manner from a value below the set error rate threshold value (i.e. good reception) to a value far above the threshold value (abrupt interruption of the reception), merely a noise or characteristic signal is given at the outputs of the signal processor as previously described.

If, however, the increase in the error rate proceeds slowly and smoothly up to the complete interruption of the reception, then, upon exceeding the error rate threshold value, a reception frequency from an acceptably receivable transmitter having the same or another programme, to which the HF/IF section 3 is newly tuned after the abrupt interruption of reception, is searched for in the micro-processor. Thereby, it is ensured that, even after the interruption of the reception, when no data regarding another transmitter can be received any longer, the radio broadcast receiver switches automatically to an acceptably receivable transmitter preferably having the same programme. A slow and smooth increase of the error rate is an indication that the coverage area of a transmitter is being left e.g. while driving, a jumplike increase of the error rate means that one is driving below or through a bridge or tunnel etc, whereby the HF/IF section 3 remains tuned to the same transmitter.

I claim:

1. Method of processing received digitally coded audio data signal to produce a sound reproduction signal, comprising:

digitally measuring, using the bit error rate of the audio data, a quality factor of the digitally coded audio data and forming a related quality value;

comparing the quality value with a predetermined threshold value, the threshold value indicating a related transmission/reception quality which is better than the quality of digitally decoded audio data in the case of non-correctable transmission/reception errors;

artificially further reducing the reproduction quality of the sound reproduction signal, so that it is perceptible to a listener, by altering at least one characteristic of said reproduction signal, when the quality value falls below the threshold value; and wherein the step of digitally measuring includes low pass filtering the bit error rate to provide said artificial quality reduction on the basis of a average quality factor.

2. Method in accordance with claim 1, wherein said digitally coded audio data signal is a digital audio broadcasting data signal (DAB).

3. Method in accordance with claim 1, wherein said quality reduction step includes;

adding a noise signal to the reproduction signal when the quality value falls below the threshold value.

4. Method in accordance with claim 1, wherein said quality reduction step includes;

low pass filtering the reproduction signal when the quality value falls below the threshold value.

5. Method in accordance with claim 1, wherein said quality reduction step includes;

reducing the volume of the reproduction signal when the quality value falls below the threshold value.

6. Method in accordance with claim 1, wherein said method is carried out by a mobile audio signal receiving device, and including the step of;

decreasing the threshold value as the speed of travel of the receiving device increases.

7. A radio broadcast receiver apparatus for receiving digitally coded audio broadcasting data (DAB) signal and providing a sound reproduction signal, including:

digital measuring means for determining a transmission/reception bit error rate quality factor of the received digitally coded audio data signal including detection means for providing a bit error rate indicating signal and means for low pass filtering the measured bit error rate indicating signal to provide a related quality value indicating signal;

comparator means for comparing the quality value indicating signal with a preselected threshold value signal, said threshold value signal indicating a related transmission/reception quality which is better than the quality of digitally coded data signal in the case of non-correctable transmission/reception errors; and signal processing means responsive to said received digitally coded audio data signal and controlled by said comparator means, for artificially altering at least one characteristic of the sound reproduction signal which is perceptible to a listener to further lower the reproduction quality of said sound reproduction signal, when the quality value indicating signal is less than the threshold value signal.

8. The receiver apparatus according to claim 7, including;

means for adding a noise signal to the sound reproduction signal.

9. The receiver apparatus according to claim 7, including;

means for low pass filtering the sound reproduction signal.

10. The receiver apparatus according to claim 7, including;

means for reducing the volume of the sound reproduction signal.

11. The receiver apparatus according to claim 7, wherein said receiver is a mobile receiver, and including;

means for reducing the threshold value signal as the speed of travel of the receiver increases.

* * * * *